(12) United States Patent
Jernigan, IV et al.

(10) Patent No.: US 8,949,614 B1
(45) Date of Patent: Feb. 3, 2015

(54) HIGHLY EFFICIENT GUARANTEE OF DATA CONSISTENCY

(75) Inventors: Richard P. Jernigan, IV, Sewickley, PA (US); Robert Wyckoff Hyer, Jr., Mars, PA (US); John R. Boyles, Cranberry Township, PA (US)

(73) Assignee: NetApp, Inc., Sunnyvale, CA (US)

( * ) Notice: Subject to any disclaimer, the term of this patent is extended or adjusted under 35 U.S.C. 154(b) by 1496 days.

(21) Appl. No.: 12/105,847

(22) Filed: Apr. 18, 2008

(51) Int. Cl.
*H04L 9/00* (2006.01)
*G06F 12/16* (2006.01)
*G06F 7/00* (2006.01)

(52) U.S. Cl.
USPC ............................. 713/178; 711/114; 707/10

(58) Field of Classification Search
CPC ................. H04L 29/06761; H04L 63/0807; H04L 9/3213; G06F 21/33
USPC ........................................................ 713/178
See application file for complete search history.

(56) References Cited

U.S. PATENT DOCUMENTS

| | | | |
|---|---|---|---|
| 6,658,417 B1 * | 12/2003 | Stakutis et al. ...................... 1/1 |
| 6,693,888 B2 * | 2/2004 | Cafarelli et al. .............. 370/338 |
| 6,842,825 B2 * | 1/2005 | Geiner et al. ................. 711/133 |
| 7,363,444 B2 * | 4/2008 | Ji ................................... 711/161 |
| 7,409,497 B1 * | 8/2008 | Kazar et al. ................... 711/114 |
| 7,424,519 B2 * | 9/2008 | Hoshino et al. ............... 709/212 |
| 7,644,308 B2 * | 1/2010 | Voigt et al. ....................... 714/20 |
| 7,721,045 B1 * | 5/2010 | Kazar et al. ................... 711/114 |
| 2003/0131068 A1 * | 7/2003 | Hoshino et al. ............... 709/216 |
| 2004/0030837 A1 * | 2/2004 | Geiner et al. ................. 711/133 |
| 2004/0133608 A1 * | 7/2004 | Saake et al. ................... 707/200 |
| 2006/0080574 A1 * | 4/2006 | Saito et al. ....................... 714/11 |
| 2006/0155946 A1 * | 7/2006 | Ji ................................... 711/162 |
| 2007/0112890 A1 * | 5/2007 | Murase ......................... 707/204 |
| 2007/0214194 A1 * | 9/2007 | Reuter .......................... 707/204 |
| 2007/0226533 A1 * | 9/2007 | Hafner et al. .................... 714/6 |
| 2007/0260830 A1 * | 11/2007 | Faibish et al. ................ 711/162 |
| 2007/0260842 A1 * | 11/2007 | Faibish et al. ................ 711/170 |
| 2008/0005468 A1 * | 1/2008 | Faibish et al. ................ 711/114 |
| 2008/0034381 A1 * | 2/2008 | Jalon et al. ................... 719/329 |
| 2008/0201290 A1 * | 8/2008 | Ponmudi .......................... 707/1 |
| 2009/0049291 A1 * | 2/2009 | Benhase et al. ................. 713/2 |
| 2009/0300078 A1 * | 12/2009 | Boyd et al. ................... 707/204 |
| 2009/0300304 A1 * | 12/2009 | Boyd et al. ................... 711/162 |

* cited by examiner

*Primary Examiner* — Azizul Choudhury
*Assistant Examiner* — Tariq Najee-Ullah
(74) *Attorney, Agent, or Firm* — Perkins Coie LLP

(57) ABSTRACT

The disclosed embodiments are directed to improving the efficiency of guaranteeing data consistency to clients, such as for one or more objects stored on a plurality of volumes configured as a Striped Volume Set. In particular, the disclosed embodiments optimize requests from clients which span multiple Data Volumes and which require strong serialization. The disclosed embodiments provide a "viral ticket book" model that provides lower latency while improving compatibility with client protocols.

24 Claims, 11 Drawing Sheets

HIGHLY EFFICIENT GUARANTEE OF DATA CONSISTENCY

RELATED APPLICATIONS

The present application is related to the following U.S. patent applications, the contents of all of which are hereby incorporated by reference:

U.S. patent application Ser. No. 10/727,169, entitled METHOD AND APPARATUS FOR DATA STORAGE USING STRIPING, by Michael L. Kazar, et al, filed on Dec. 2, 2003;

U.S. patent application Ser. No. 11/119,278, entitled STORAGE SYSTEM ARCHITECTURE FOR STRIPING DATA CONTAINER CONTENT ACROSS VOLUMES OF A CLUSTER, by Michael Kazar, et al., filed Apr. 29, 2005; and U.S. patent application Ser. No. 11/261,007, entitled SYSTEM AND METHOD FOR EFFICIENTLY GUARANTEEING DATA CONSISTENCY TO CLIENTS OF A STORAGE SYSTEM CLUSTER, by Michael Kazar, et al., filed on Oct. 28, 2005.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files, logical units or other objects. For example, each "on-disk" file may be implemented as a set of data structures, i.e., disk or data blocks, configured to store information, such as the actual data for the file.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. However, often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system.

"Weak serialization" may refer to the servicing of multiple data access requests distributed among multiple volumes from clients which do not require that multiple requests to access the same data container, or portion thereof, be serviced in any particular order. In storage systems which service clients of this type, mechanisms may be provided to service those requests in a manner that promotes efficient operation of the storage system. "Strong serialization" may refer to the servicing of requests for clients which do require that multiple requests from one or more clients to the same data container, or portion thereof, at least appear to be serviced in an order expected by those clients. With regards to these types of clients, additional mechanisms may be required to efficiently service their requests.

DETAILED DESCRIPTION OF THE DRAWINGS AND PRESENTLY PREFERRED EMBODIMENTS

Figure 1:
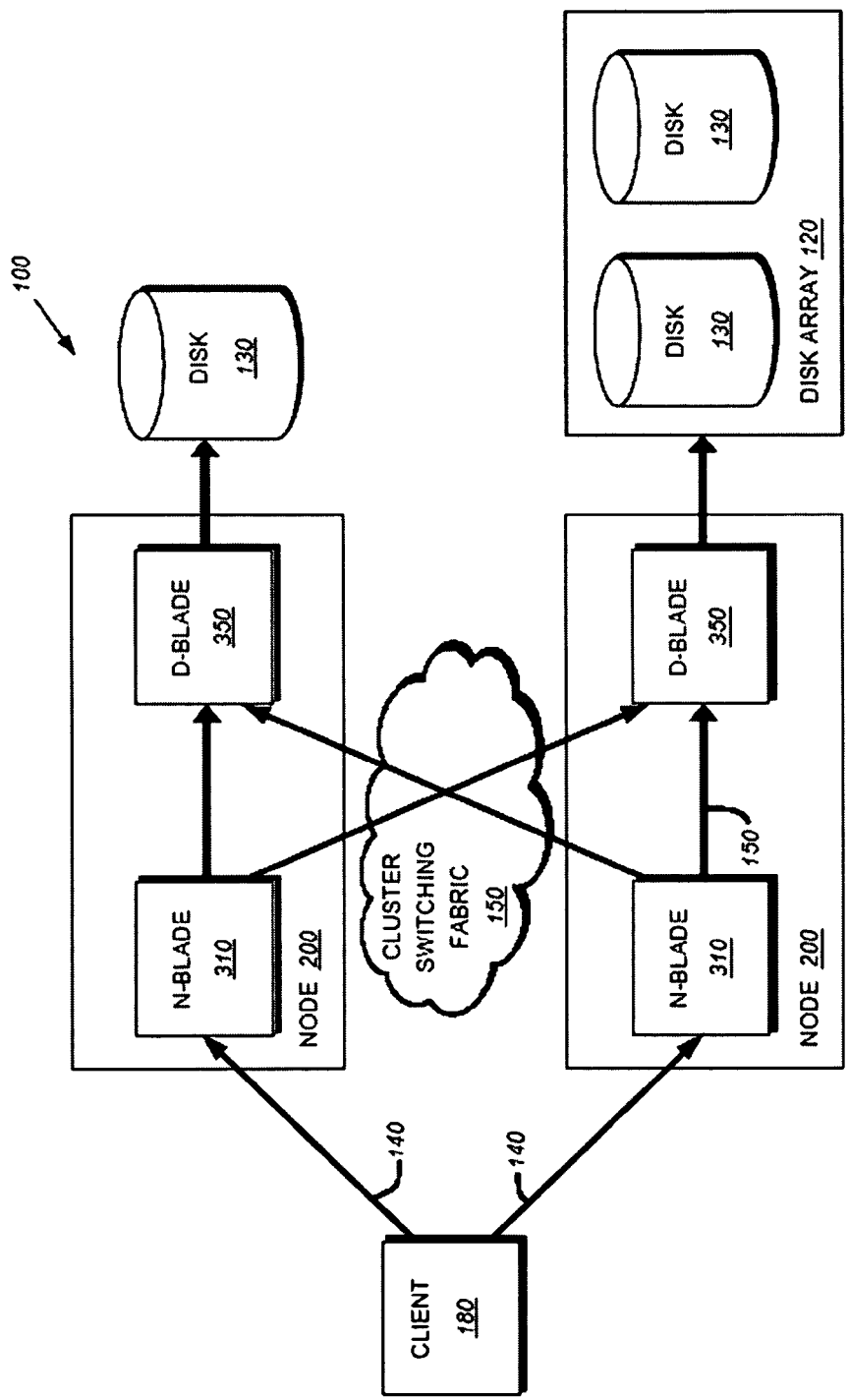
FIG. 1 is a schematic block diagram of a plurality of nodes interconnected as a cluster in accordance with one embodiment.

By way of introduction, the disclosed embodiments relate to improving the efficiency of guaranteeing data consistency to clients, such as for one or more data containers, e.g. files, or other objects, e.g. directories, stored on a plurality of volumes configured as a Striped Volume Set ("SVS"). Data consistency refers to the expectation by a given client as to the order in which requests at least appear to be serviced by a file system. Clients may validate an expected ordering by observing attributes associated with the object, such as data modification timestamps, returned by the file system in response to data access requests, referred to as "post operation attributes." In particular, the disclosed embodiments optimize requests from clients for objects which span multiple Data Volumes and which require strong serialization, i.e. that requests at least appear to be serviced in an expected order based on, for example, the attributes, such as the data modification timestamps, of the object. The disclosed embodiments provide a "viral ticket book" model that provides lower latency while improving compatibility with client protocols by caching the ticket book, i.e. allocations of data modification timestamps, at the network interfaces of the storage system. Thereby, the network interfaces become proxies for the requesting clients, e.g. represent the clients' expectations, with respect to the attributes that are provided by the storage system, via the network interfaces, in response to data access requests from those requesting clients.

In prior file systems, centrally allocated non-overlapping blocks/ranges of data modification time stamps, referred to herein as "ticket books," described in more detail below, may be employed to improve storage system performance for clients that do not require strong serialization semantics, i.e. do not require, for example, that particular data operations on the same data be performed in the order in which they were received. When the file system performs requested operations which modify objects, or portions thereof, a modification time attribute, referred to as an "mtime," is assigned to the object indicative of the state of the file, or portion thereof, at the time the modification request is performed. This mtime may be returned to the requesting client in response to a request to perform an operation. In systems which utilize ticket books, these mtimes are assigned from a ticket book. Because different portions of the file system may be performing modification operations at any given time and need to assign mtimes, each may hold a ticket book, as described below, from which they can assign mtimes without assigning duplicate mtimes. For clients using file system protocols that support weak serialization semantics, i.e. allow operations to occur in an order different from the order in which they are received, such as CIFS, a data volume ("DV") may utilize a ticket book in a manner that obviates the need to guarantee that each subsequently assigned data modification time stamp always increases, i.e. are always later in time. That is, a DV may assign an mtime from its ticket book to a particular portion of a file stored therein, while another DV storing a different portion of the file subsequently assigns an earlier mtime from its ticket book, e.g. the modification appears to have occurred earlier in time to the client when in fact it occurred later in time.

However, in these prior systems for clients using file system protocols that require strong serialization semantics, the DV may only use the ticket book if it received file operations prior to requesting (and granting of) that ticket book. This further includes clients requiring strong serialization semantics which may share data with other clients using file system protocols that do not require strong serialization semantics. Otherwise, a new ticket book is requested (and granted) from the Container Attribute Volume ("CAV") 1810, also referred to as the File Attribute Volume ("FAV") or File Attribute Server ("FAS"), to process the received file operations. This new ticket book will contain a new allocation of non-overlapping time stamps which will all be greater (later in time) than prior allocations. This allows the DV to assign an mtime therefrom which is guaranteed to be greater than previously the assigned mtime and, thereby, ensure that client receives the expected results of their request, i.e. that the particular operation was serviced later in time as expected. Use of the ticket book in connection with weak serialization semantics thus reduces the number of round trip exchanges needed between the DV and CAV to service file operations. In other words, because the DV does not have to stall operation requests waiting for the grant of a new ticket book, the number of round trip exchanges between the DV and CAV is reduced compared to the number of round trip exchanges needed for protocols that require strong serialization semantics.

To improve efficiency, the disclosed embodiments optimize requests from clients which span multiple DV's and which require strong serialization to ensure perception by a client of a sequence of operations with respect to a given object, based on its attributes, at any one of a number of interfaces to the file system. The disclosed embodiments provide a new form of "ticket book," as described above, referred to as a "viral" ticket book, that provides lower latency while improving compatibility with client protocols. While the embodiments below are described in relation to files, it will be appreciated that the disclosed mechanisms may be used with other objects, such as directories, which span multiple DV's.

As discussed above, a plurality of storage systems may be interconnected to provide a storage system environment configured to service many clients. Each storage system may be configured to service one or more volumes, wherein each volume stores one or more data containers. However, often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that file may exceed its processing resources and become overburdened along with a concomitant degradation of speed and performance.

This may be overcome by striping the file across a plurality of volumes configured as a striped volume set (SVS), where each volume, such as a data volume (DV), is serviced by a different storage system, thereby distributing the load for the single file among a plurality of storage systems. According to the data container striping arrangement, each storage system may service access requests (i.e., file operations) from clients directed to the same file. File operations, such as read and write operations, are forwarded directly to the storage systems that are responsible for their portions of the data for that file.

In addition to the file data, there are metadata, such as timestamps and length, associated with the file. As was described, a timestamp is a file attribute that provides an indication of the last time the file was modified, i.e., the modification time (mtime) for the file. The mtime is typically consulted on every operation directed to the file and, in the case of a write operation, is changed. For example, in response to a read operation issued by a client, the storage system returns the data and the current mtime on the file, whereas in response to a write operation, the storage system returns an incremented mtime. Effectively, every successive write operation is accorded a greater mtime than the one before it.

Many client protocols, such as the Network File System (NFS) protocol, allow use of client-side "caching" of data retrieved from a storage system. In response to a read operation issued by a client for a file, the storage system returns the requested data along with the current mtime of the file. The client stores the information in a cache memory so that future read operations directed to that file data may be serviced locally at the client (from the cache) instead of remotely over the network. For such client-side caching to operate properly, there should be guarantees that the data subsequently retrieved from the cache is consistent with the actual file system and not "stale", i.e., that the file data has not changed since it was cached at the client. To that end, the NFS protocol enables periodic "pinging" (polling) of the state of the file by the client through requests for the current mtime of the file from the storage system If the mtime has not increased since the data was cached, the client-side cache is maintained "fresh," and the client continues to use the cached data. If the mtime has changed, then the client discards its cached data and reissues a read operation to the storage system for file data.

Note that, as used herein, file operations are "serializable" if they can be replayed in a reported order and the result is identical to the actual file system. File operations are "causally connected" if they affect the same metadata or the same region of the same file. Some client protocols (like NFSv2) require "strong serialization semantics"; that is, mtimes must always increase for operations that complete with increasing wall-clock time, even if they are not causally connected. "Weak serialization semantics", on the other hand, only require that mtimes always increase for operation that complete with increasing wall-clock time if the operations are causally connected.

Certain file system protocols, such as the Common Internet File System (CIFS) protocol, support weak serialization semantics because of the nature of soft locks, such as opportunistic locks (op-locks), which is a mechanism by which the file system allows one client to control, i.e. read and write, a range of file data to the exclusion of other clients. An op-lock is an automatically revocable soft lock that allows a client to operate on a range of file data until such time as a server (e.g., the storage system) instructs the client to stop. That is, the client can cache the data and perform read and write operations on the cached data until the storage system instructs it to return that data to the system. The client can cache the results of write operations since it knows that no other access is allowed to that same region of the file as long as it has an op-lock on the region. As soon as a second client attempts a conflicting operation on that region of the file, the storage system blocks the conflicting operation and revokes the op-lock. In particular, the storage system instructs the client to return ("flush") any write modifications to the system and then discard the entire content of its client-side cache. Once that happens, the storage system unblocks the second client and grants it an op-lock to the conflicting region.

NFSv2 and NFSv3 protocols do not utilize op-locks and, thus, do not employ the above revocation system. For these protocols, the storage system typically relies on strong serialization semantics. Other protocols, such as the NFSv4 protocol, use a type of soft lock called delegations that allows the storage system to use weak serialization semantics. Because CIFS and NFSv4 clients rely on such a "rough" protocol for guaranteeing consistency of cached data, they are not concerned with mtimes associated with read and write operations. This, in turn, enables the storage system to service such operation requests with weak serialization semantics.

In typical data container striping arrangements, there is one volume, i.e., the container attribute volume (CAV), which is responsible for all the timestamps of a particular file stored on the SVS. As a result, for each file operation, the DV accesses the CAV to determine the mtime for the file. In response, the CAV updates the mtime on disk and returns the updated mtime to the DV which, in turn, returns the mtime and any associated data to the client. This arrangement places a substantial load on the storage system serving the CAV with an associated decrease in system performance. Moreover, depending on the load of the SVS, the metadata requests to/from the CAV may become a bottleneck that adversely impacts performance of the system by, e.g., causing certain storage systems to stall (wait) until their metadata requests have been processed before servicing client data access requests.

A. Cluster Environment

FIG. 1 is a schematic block diagram of a plurality of nodes 200 interconnected as a cluster 100 and configured to provide storage services relating to the organization of information on storage devices. The nodes 200 comprise various functional components that cooperate to provide a distributed storage system architecture of the cluster 100. To that end, each node 200 is generally organized as a network element 310, referred to as an "N-blade 310," and a disk element 350, referred to as a "D-blade 350." The N-blade 310 includes functionality that enables the node 200 to connect to clients 180 over a computer network 140, such as a TCP/IP based network, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch. It should be noted that while there is shown an equal number of N and D-blades in the illustrative cluster 100, there may be differing numbers of N and/or D-blades in accordance with various embodiments of the present invention. For example, there may be a plurality of N-blades and/or D-blades interconnected in a cluster configuration 100 that does not reflect a one-to-one correspondence between the N and D-blades. As such, the description of a node 200 comprising one N-blade and one D-blade should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
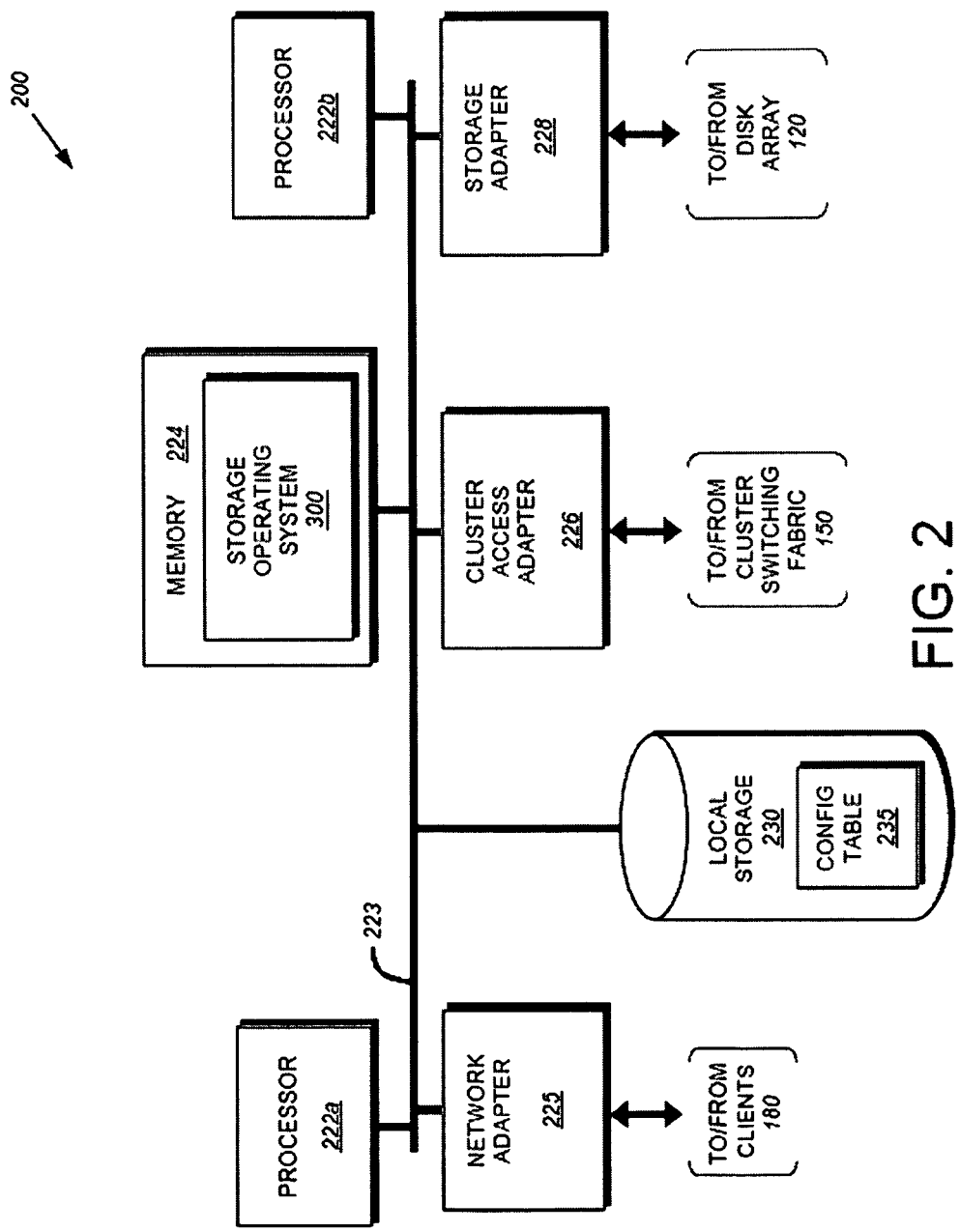
FIG. 2 is a schematic block diagram of a node, such as a storage system, in accordance with one embodiment.

FIG. 2 is a schematic block diagram of a node 200 that is illustratively embodied as a storage system comprising a plurality of processors 222a,b, a memory 224, a network adapter 225, a cluster access adapter 226, a storage adapter 228, and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, the node 200 may alternatively comprise a single or more than two processor system. Illustratively, one processor 222a executes the functions of the N-blade 310 on the node, while the other processor 222b executes the functions of the D-blade 350.

The memory 224 illustratively comprises storage locations that are addressable by the processors and adapters for storing software program code and data structures. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory elements, including various computer readable media, may be used for storing and executing program instructions pertaining to the embodiments described herein.

The network adapter 225 comprises a plurality of ports adapted to place the node 200 in communication with one or more clients 180, such as over point-to-point links, wide area networks, virtual private networks implemented over a public network (Internet) or a shared local area network or combinations thereof. As used herein, "in communication with" means in direct communication with or indirect communication with through one or more components that or may not be shown herein. Such components may include wired or wireless hardware components or software components, or combinations thereof. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to predefined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the embodiments described herein.

C. Storage Operating System

To facilitate access to the disks 130, the storage operating system 300 may implement a write-anywhere file system that cooperates with one or more virtualization modules to "virtualize" the storage space provided by disks 130. The file system logically organizes the information as a hierarchical structure of named directories and files on the disks. Each "on-disk" file may be implemented as a set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the embodiments described herein. As such, where the term "WAFL" is employed, it should be taken broadly to refer to any storage operating system that is otherwise adaptable to the teachings herein.

Figure 3:
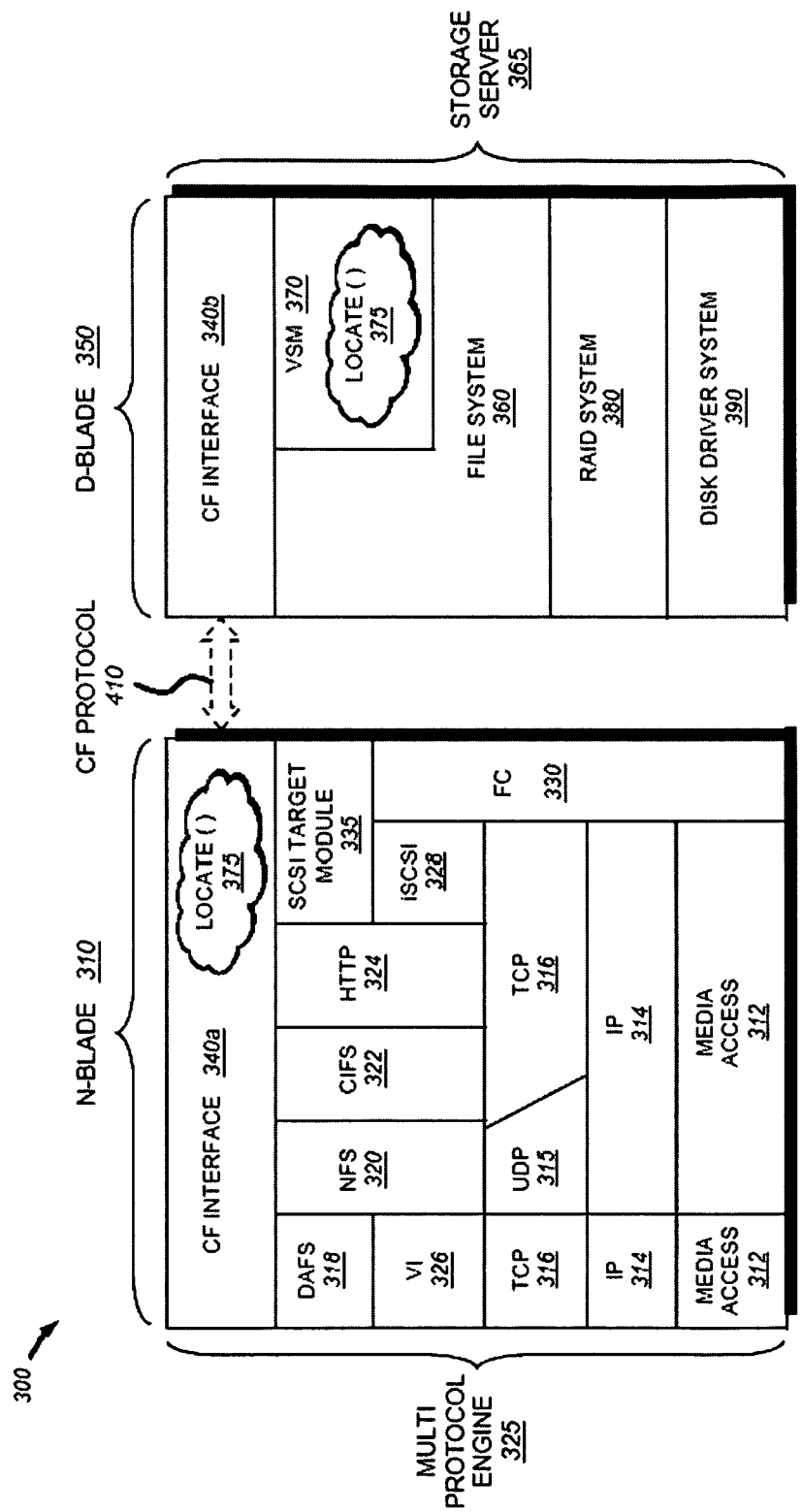
FIG. 3 is a schematic block diagram of a storage operating system that may be advantageously used with the disclosed embodiments.

FIG. 3 is a schematic block diagram of the storage operating system 300 that may be advantageously used with the disclosed embodiments. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) described herein. As described further herein, the VSM cooperates with the file system 360 to enable the storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework, in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as timestamps, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk, dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware software, or combinations thereof.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the embodiments described herein may apply to any type of special-purpose (e.g., file server, filer or storage serving appliance) or general-purpose node or computer, including a standalone computer or portion thereof, embodied as or including a storage system. Such storage systems may support file-level access, block-level access, or other granularity of access, or combinations thereof. Moreover, the teachings herein can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings herein may be utilized with any suitable file system, including a write in place file system.

D. CF Protocol

In the illustrative embodiment, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 340a,b adapted to implement intra-cluster communication among the blades, including D-blade-to-D-blade communication, for data container striping operations described herein.

The protocol layers, e.g., the NFS/CIFS layers and the iSCSI/FC layers, of the N-blade 310 function as protocol servers that translate file-based and block based data access requests from clients into CF protocol messages used for communication with the D-blade 350. That is, the N-blade servers convert the incoming data access requests into file system primitive operations (commands) that are embedded within CF messages by the CF interface module 340 for transmission to the D-blades 350 of the cluster 100. Notably, the CF interface modules 340 cooperate to provide a single file system image across all D-blades 350 in the cluster 100. Thus, any network port of an N-blade that receives a client request can access any data container within the single file system image located on any D-blade 350 of the cluster.

Further to the illustrative embodiment, the N-blade 310 and D-blade 350 are implemented as separately-scheduled processes of storage operating system 300; however, in an alternate embodiment, the blades may be implemented as pieces of code within a single operating system process. Communication between an N-blade and D-blade is thus illustratively effected through the use of message passing between the blades although, in the case of remote communication between an N-blade and D-blade of different nodes, such message passing occurs over the cluster switching fabric 150. A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340a on N-blade 310 encapsulates a CF message as (i) a local procedure call (LPC) when communicating a file system command to a D-blade 350 residing on the same node 200 or (ii) a remote procedure call (RPC) when communicating the command to a D-blade residing on a remote node of the cluster 100. In either case, the CF decoder of CF interface 340b on D-blade 350 de-encapsulates the CF message and processes the file system command.

E. Storage System Architecture

The disclosed embodiments are related to a storage system architecture illustratively comprising two or more volumes 910 distributed across a plurality of nodes 200 of cluster 100. The volumes are organized as a SVS and configured to store content of data containers, such as files and luns, served by the cluster in response to multi-protocol data access requests issued by clients 180. Notably, the content of each data container is apportioned among the volumes of the SVS to thereby improve the efficiency of storage service provided by the cluster. To facilitate a description and understanding, data containers are hereinafter referred to generally as "files".

The SVS comprises a metadata volume (MDV) and one or more data volumes (DV). The MDV is configured to store a canonical copy of certain metadata, including access control lists (ACLs) and directories, associated with all files stored on the SVS, whereas each DV is configured to store, at least, data content of those files. For each file stored on the SVS, one volume is designated the container attribute volume (CAV) and, to that end, is configured to store ("cache") certain, rapidly-changing attribute metadata, including time stamps and file length, associated with that file to thereby offload access requests that would otherwise be directed to the MDV.

In the illustrative embodiment described herein, determination of the CAV for a file is based on a simple rule: designate the volume holding the first stripe of content (data) for the file as the CAV for the file. Not only is this simple rule convenient, but it also provides an optimization for small files. That is, a CAV may be able to perform certain operations without having to communicate with other volumes of the SVS if the file is small enough to fit within the specified stripe width. Ideally, the first stripes of data for files are distributed among the DVs of the SVS to thereby facilitate even distribution of CAV designations among the volumes of the SVS. In alternate embodiments, data for files is striped across the MDV and the DVs.

F. Data Consistency Guarantees

In one embodiment, data consistency is guaranteed to clients for one or more data containers stored on a plurality of volumes configured as a SVS. As noted, the SVS comprises one MDV configured to store a canonical copy of certain metadata, including access control lists and directories, associated with all data containers stored on the SVS, and one or more DVs configured to store, at least, data content of those containers. In addition, for each data container stored on the SVS, one volume is designated the CAV and, as such, is configured to store certain, rapidly-changing attribute metadata, including timestamps and length, associated with that container.

Figure 4:
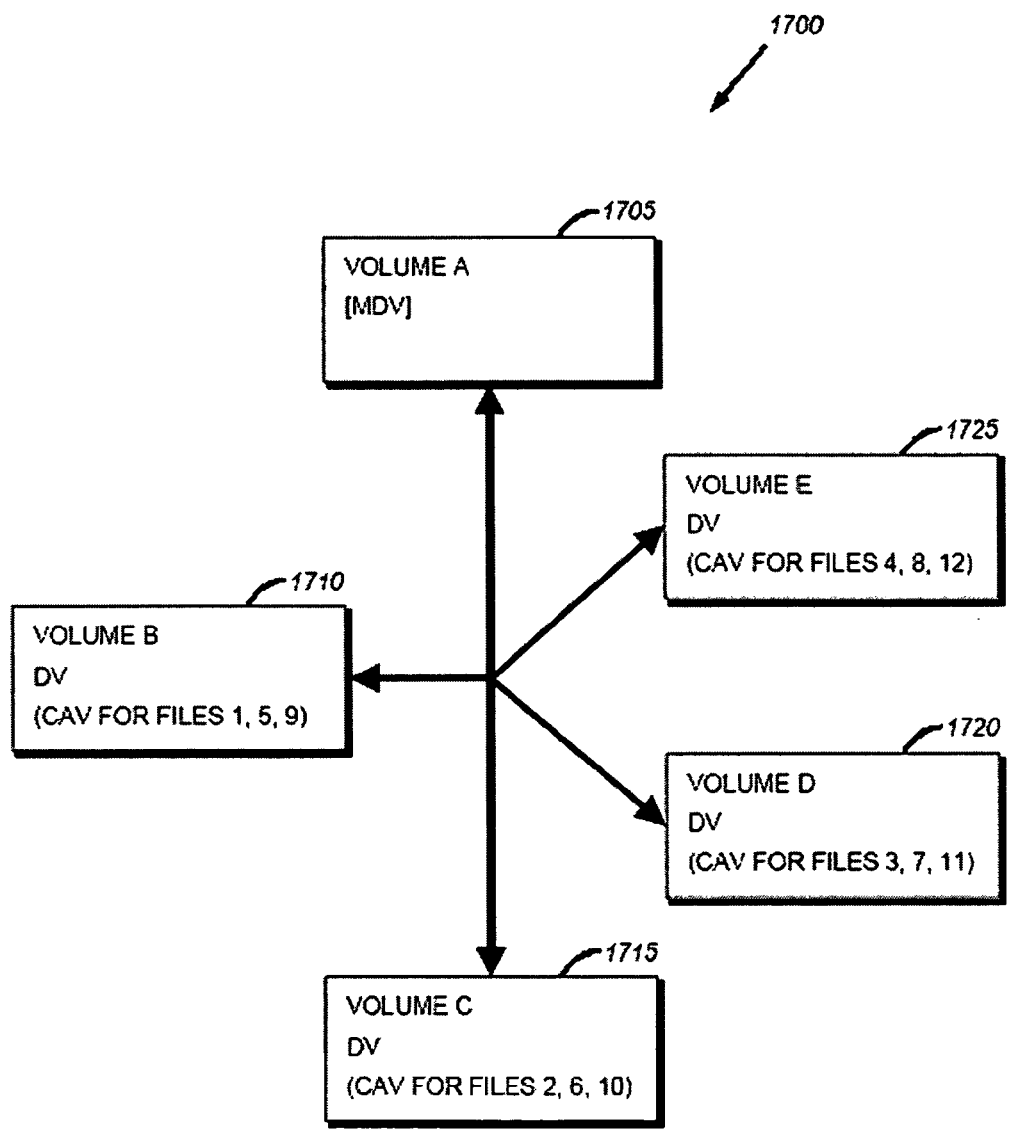
FIG. 4 is a schematic block diagram of an exemplary SVS in accordance with one embodiment.

FIG. 4 is a schematic block diagram of an exemplary five volume SVS environment 1700 in accordance with one embodiment. The SVS 1700 comprises five volumes, namely volume A 1705, volume B 1710, volume C 1715, volume D 1720 and volume E 1725. It should be noted that five volumes are shown for illustrative purposes only and that the teachings of the disclosed embodiments may be utilized with SVSs having any number of volumes. In the illustrative environment 1700, volume A 1705 is designated the MDV, with the other four volumes functioning as DVs associated with the SVS.

Twelve data containers, e.g., files (files 1-12), are illustratively stored on the volumes of the SVS, wherein each volume serves as the CAV for any file whose first stripe is stored therein. Notably, the CAV is a role that the MDV or DV serves for a particular file to store (and serve) rapidly-changing attribute metadata for the file. Thus, for example, volume B 1710 serves as the CAV for files 1, 5, 9. Similarly, volume C 1715 serves as the CAV for files 2, 6 and 10, volume D 1720 serves as the CAV for files 3, 7 and 11 and volume E serves as the CAV for files 4, 8 and 12. Volume A 1705, which serves as the MDV for the SVS does not, in the illustrative embodiment, serve as the CAV for any files. In alternate embodiments, the MDV may serve as the CAV for files. By distributing the role of the CAV among the SVS volumes, each volume serves as a CAV for an approximately equal number of files.

The metadata associated with the files stored on the SVS are illustratively organized into various categories (e.g., MD1-MD3) along functional boundaries and are resident on various volumes to optimize data access (e.g., read and write) paths through the SVS. These categories include (i) MD1 metadata that changes on every data access (read/write) request served by the SVS, (ii) MD2 metadata that may be retrieved (but not changed) on every request and (iii) MD3 metadata that is unused for the read/write requests. Since it changes on every read/write request served by the DVs of the SVS, the MD1 metadata is canonically resident on the CAV and generally cached on the DVs. Likewise, since it may be retrieved, but does not change, on every request served by the DVs, the MD2 metadata is canonically resident on the MDV and generally cached on all DVs of the SVS, including the volume designated as CAV. Finally, since it is unused for a read/write request, the MD3 metadata is canonically, and solely, resident on the MDV.

Figure 5:
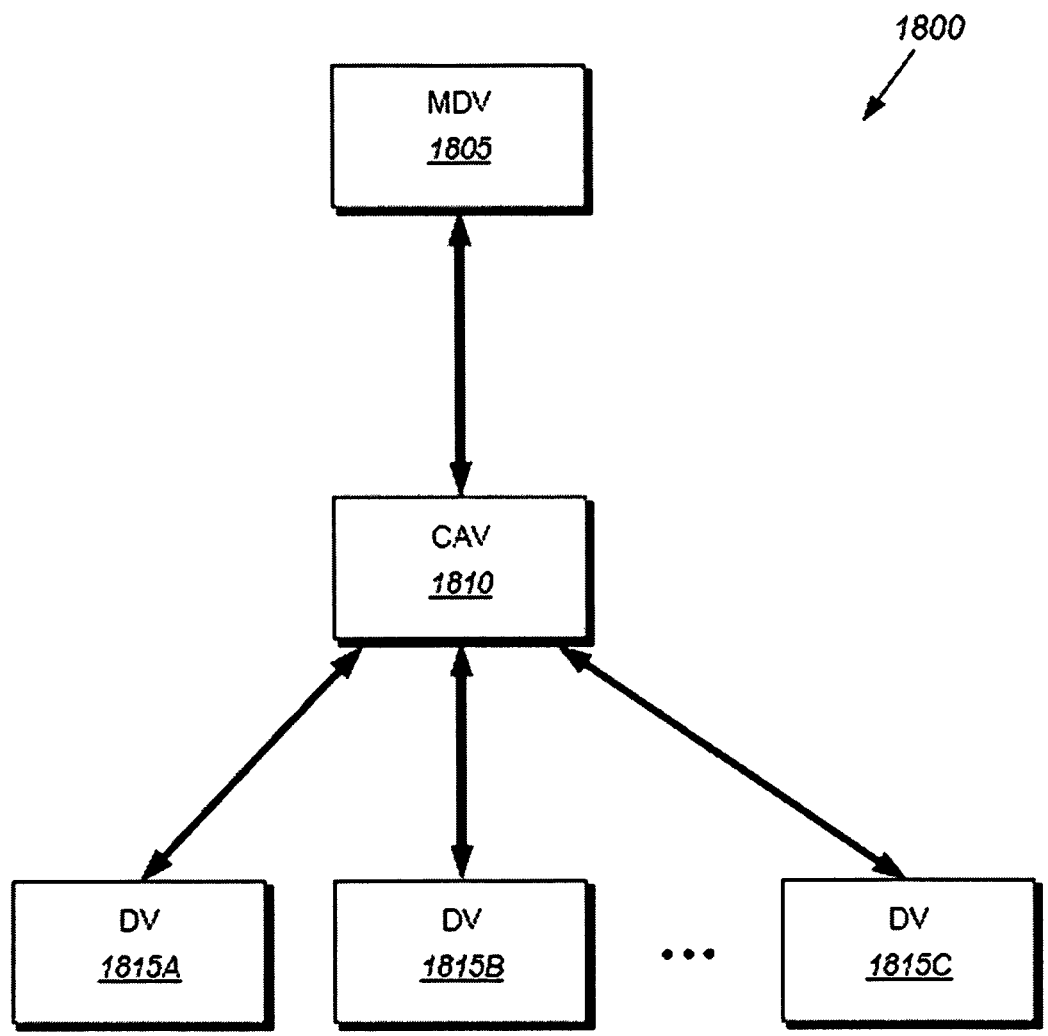
FIG. 5 is a schematic block diagram of an exemplary SVS in accordance with one embodiment.

In the illustrative embodiment, the CAV cooperates with the MDV and DVs of the SVS to provide a multi-tier caching and distribution architecture that offloads metadata access requests that would otherwise be directed to the MDV. FIG. 5 is a schematic block diagram of an exemplary multi-tier metadata caching and distribution hierarchical environment 1800 in accordance with one embodiment. As noted, MDV 1805 stores a canonical copy of MD2 and MD3 metadata for all of the files stored on the SVS. Here, the CAV is utilized as a first tier caching and distribution point for storing and distributing most metadata, e.g., MD1 and MD2, for use by the DVs 1815.

As noted above, every volume within the SVS serves as a CAV for a portion of the files stored on the SVS. Illustratively, the volume storing the first stripe of the file is deemed to be the CAV. Thus, different volumes of the environment 1800 may serve as the CAV 1810 depending on the particular files. Moreover, the MDV may serve as the CAV for certain files. In such a case, the roles of the CAV and MDV are merged due to the fact that the volume contains a canonical copy of all (MD1-MD3) metadata. For those files stored on a SVS volume having a merged CAV/MDV role, no first tier caching and distribution point is utilized in the hierarchical environment 1800.

Data consistency guarantees of data containers, e.g., files, stored on the SVS are generally provided by delegating to the DVs sufficient authority to autonomously service I/O requests directed to the files using at least some of the rapidly-changing attribute metadata, e.g., the timestamps, of the files. As noted, each node includes a D-blade 350 configured to service a volume, such as the MDV 1805, DV 1815 or CAV 1810. To further facilitate a description and understanding, references to the "MDV", "DV" and "CAV" may include the D-blades configured to service those volumes. Specifically, a DV 1815 is only allowed to service I/O requests, e.g., read and write operations, to a file if it has a valid ticket book for the file. A DV requests and is granted the ticket book from the CAV 1810 on a per-file basis, although a DV may have any number of allocated ticket books based on the number of outstanding or currently active files.

Figure 6:
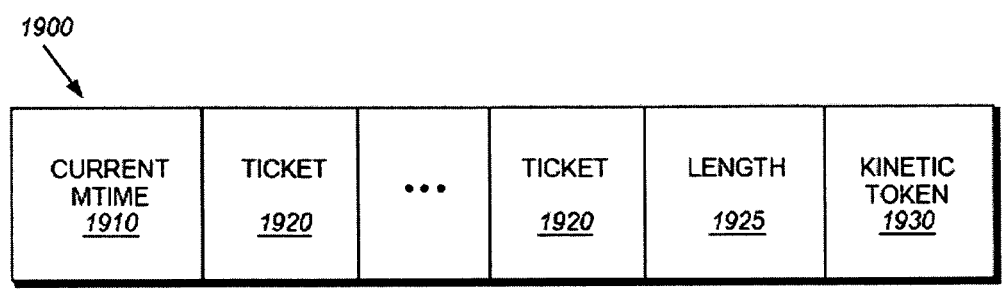
FIG. 6 is a schematic block diagram of a ticket book that may be advantageously used with the disclosed embodiments.

FIG. 6 is a schematic block diagram of a ticket book 1900 that may be advantageously used with the disclosed embodiments. The ticket book 1900 is illustratively a data structure generated by the CAV and comprising an indication of current timestamps, such as the current modification time (mtime) 1910, on a file plus zero or more "tickets" 1920, i.e., new mtime values, that the DV is allowed to "hand out" (return) to a client for each new write operation. The types of ticket books illustratively include (i) a read ticket book that contains the current mtime and no tickets and (ii) a write ticket book that contains the current mtime and tickets representing a range of mtimes, e.g., 50 (or 100 or 200) milliseconds worth of time stamps, that the DV is capable of autonomously returning to the client. Write operations require a write ticket book, while read and prefetch operations require at least a read ticket book. The write ticket book (hereinafter "ticket book") is illustratively a read ticket book with one or more tickets that can be used to change (e.g., increment) the timestamps in response to write operations.

As described, the ticket book 1900 may be employed to improve storage system performance for clients that do not require strong serialization semantics. That is, for clients using file system protocols that support weak serialization semantics, such as CIFS, the DV 1815 may utilize the ticket book in a manner that obviates the need to guarantee that the mtimes, as perceived by the clients, always increase. For clients using file system protocols that require strong serialization semantics, the DV may only use the ticket book if it received file operations prior to requesting (and granting of) that ticket book. Otherwise, a new ticket book is requested (and granted) from the CAV 1810 to process the received file operations. Use of the ticket book in connection with weak serialization semantics thus reduces the number of round trip exchanges needed between the DV and CAV to service file operations. In other words, because the DV does not have to stall operation requests waiting for the grant of a new ticket book, the number of round trip exchanges is reduced compared to the number of round trip exchanges needed for protocols that require strong serialization semantics.

Figure 7:
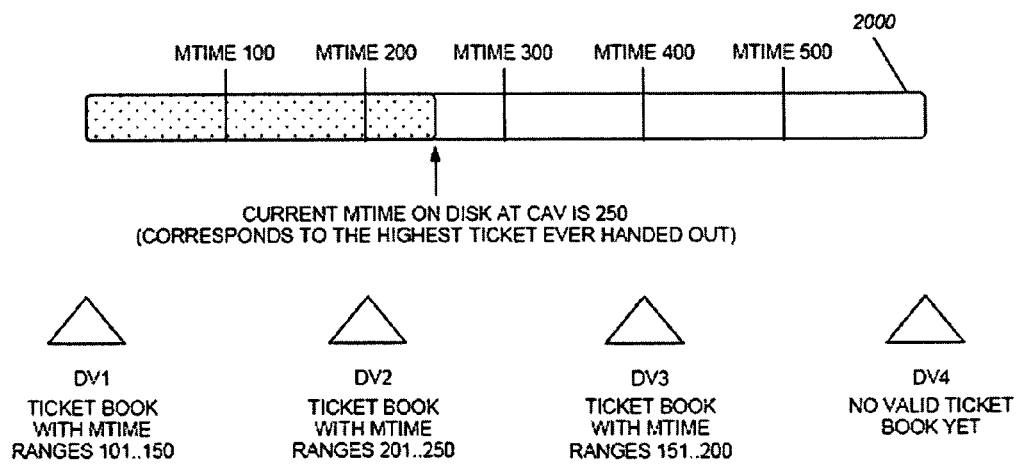
FIG. 7 is a schematic block diagram illustrating allocation of ticket books in accordance with one embodiment.

FIG. 7 is a schematic block diagram illustrating allocation of ticket books. A timeline 2000 is indexed by the mtime for a particular file. By allocating or "granting" ticket books to the DVs 1815, the CAV 1810 has effectively delegated non-overlapping ranges of the timeline 2000 for the file to those DVs, wherein the timeline pertains to I/O requests, such as read and/or write operations, directed to the file. Specifically, DV1 has a ticket book with a timestamp range that spans mtimes 101 to 150. Likewise, DV3 has a ticket book with an mtime range from 151 to 200 and DV2 has a ticket book with mtimes that span 200-250. It should be noted that none of the mtime ranges overlap. Every time the CAV grants a new ticket book to a DV, the tickets in the book represent a new non-overlapping range of timestamps on that timeline. For each new ticket book granted, the CAV 1810 returns tickets that have higher mtime values than any previous grant. For example, the next (write) ticket book granted to, e.g., DV4 may include tickets for mtimes 251 through 300.

When servicing a read operation, each DV returns the lowest mtime in its current ticket book to the requesting client. When servicing a write operation, however, the DV increases (e.g., increments) the mtime before returning it to the client. Moreover, the DV assigns a ticket 1920 from the ticket book 1900 to the write operation atomically with the step of committing the write to disk. These two aspects combine to guarantee that every new write operation that a DV completes will be assigned a post-operation mtime value that is higher than any mtime that the DV has associated with any earlier operation.

In addition, each DV allocates the mtimes of its delegated range in sequence. For example, assume DV1 has a ticket book for file A with an mtime range of 101 to 150. In response to a first read operation directed to the file, DV1 returns mtime 101 with the data. Subsequently, in response to a first write operation directed to the file, DV1 increments the mtime from 101 to 102 and returns mtime 102 with the request's post-operation attributes. DV1 then removes ticket 1920 reflecting mtime 102 from its book such that the new range is 103 to 150. Any subsequent read operations directed to the file return current mtimes of 102 until a second write operation is issued, at which time the incremented mtime 103 is returned. When it depletes those mtimes, i.e., when it returns mtime 150 and runs out of tickets, DV1 requests a new ticket book from the CAV. Alternatively, if a DV only has a read ticket book, then it must obtain a new range of the timeline from the CAV before it can service any more write operations.

Notably, there is no guarantee that the mtime always reflects "wall clock" time, i.e., the actual time of day. That is, in some circumstances it is possible (and acceptable) for a particular client to issue an I/O request (e.g., a first write operation) and receive an acknowledgment with a first mtime (e.g., 100) and then synchronously issue a second write operation and receive a smaller mtime (e.g., 50) even though the client has knowledge that the second write operation occurred after the first write operation. For example, assume that a client issues a first write operation to a first region (e.g., a stripe) of a file that is serviced by DV2 and waits for a response before proceeding with any further operations. DV2 performs the first write operation and returns mtime 201 to client for that operation. The client then issues a second write operation to a second, different stripe of the file that is serviced by DV1. DV1 performs the second write operation and returns mtime 101 to the client for that operation. Essentially, the client perceives the returned mtimes as proceeding backwards; the mtime for the second write operation is "earlier" even though the client is aware that the first write operation fully completed before the second operation began.

Certain client protocols, such as NFSv2, cannot support this situation and thus require "strong serialization semantics". As used herein, all file operations are serializable using a timeline indexed by a file's mtime. For causally connected operations, i.e. operations which affect the same metadata or the same region of the same file, increasing modification times ("mtimes") correlate with increasing wall clock time. If a client protocol requires strong serialization semantics, i.e. that operations are performed in the order of receipt, increasing mtimes correlate with increasing wall clock time. However, those client protocols that can support the situation described above accept "weak serialization semantics" and the disclosed embodiments provide optimizations to accommodate those protocols. CIFS and, to some extent, NFSv4 client protocols are configured to support weak serialization semantics; accordingly, the ticket book 1900 provides an optimization in support of such semantics. That is, weak serialization semantics allow DV1 to exploit the use of its ticket book by, e.g., obviating the need to guarantee that the mtime, as perceived by the client, always increases. Note that this situation only manifests when a client's operation requests traverse DVs, i.e., the client transitions from writing to one DV to writing to another DV. As long as the client directs requests to one DV, the mtimes always increase.

In the illustrative system, there are rules governing when a ticket book 1900 currently held by a DV 1815 can be used. Alternatively, other rules may be defined in addition to or in lieu of these exemplary rules and may be more or less restrictive depending upon the implementation thereof and the required operational semantics. If any of these exemplary rules fails, then the DV has to obtain a new ticket book from the CAV 1810 before servicing certain operation requests. According to a first exemplary rule, a DV preferably has sufficient "up-to-date" metadata to service an I/O operation to a file. Otherwise if the metadata is out-of-date for the file, the DV obtains that metadata and, in the process of obtaining that metadata, the DV obtains a new ticket book. In general, whenever a DV 1815 accesses the CAV 1810 for additional attributes or metadata, the CAV issues a new ticket book to the DV.

A second exemplary rule states that if the ticket book 1900 expires or is otherwise unusable (i.e., all tickets 1920 are exhausted) such that no further write operations can be performed, then the DV must, in at least one embodiment, obtain a new ticket book. Here, the ticket book itself may be considered a form of metadata that the DV may need to retrieve from the CAV. A ticket book may expire based on wall clock time. It is preferable that the timestamps returned to a client be generally close to actual wall clock time. After a predetermined time (e.g., 100 milliseconds or approximately 10 times a second), the DV discards its current ticket book and obtains a new ticket book the next time a request is issued to the DV. Notably, the new ticket book is obtained "on demand", i.e., when a request is received at the DV that cannot be satisfied using the current ticket book.

Illustratively, an optimization may be invoked for this second rule. If there may still be activity directed to the file and the current ticket book for the file is set to expire shortly, the DV can proactively request a new ticket book for the file so that by the time that the next request is received, the DV has the new ticket book. This optimization is based on a heuristic to decide how frequently the DV should proactively obtain a ticket book without being prompted by an incoming client request. This optimization is similar to a "metadata" read ahead operation that prepares for a new ticket book in case one is needed. However, if proactive requests are performed too aggressively, the CAV would be overloaded.

A number of different algorithms may be employed that specify when a DV should request a new ticket book from the CAV. An example of an illustrative algorithm specifies that if at least one I/O operation to a particular file is serviced using a current ticket book for that file and if the ticket book is about to expire within a predetermined time equal to the round trip time to the CAV (e.g., the next 20 milliseconds), then the DV proactively obtains a new ticket book from the CAV.

A third exemplary rule involves a situation where an I/O operation, such as a write operation, spans the end of file (EOF). Write operations that span the current EOF change the length of the file. File-length changes are considered causally connected with all other I/O operations; that is, if a file is extended by a write operation and that operation returns post-operation mtime X to the client, then all subsequent I/O operations return mtime values greater than X and all these subsequent operations use the correct, new file length. This is accomplished by providing the following third rule: when a DV 1815 wants to extend the file, it must, at least in the exemplary system, always go to the CAV 1810 to request a new ticket book.

Therefore, this aspect of the exemplary system is directed to the use of the ticket book with a file extending operation, e.g., a write operation that spans EOF and increases the length of a file. In response to servicing a write operation that attempts to extend the file, the DV advises the CAV as to the new length of the file and, in return, the CAV grants a new ticket book reflective of that new file length. In particular, the CAV invalidates all outstanding ticket books to all DVs, updates the length of the file and returns the new ticket book to the advising DV. Since no other valid ticket books are in use, each DV polls the CAV for an updated ticket book before servicing a new I/O operation. The new ticket book 1900 has tickets 1920 reflective of higher mtimes, and includes the correct new file length 1925.

For example, assume DV1 services stripes 0 to 2 megabytes of a file, DV2 services stripes 2 to 4 megabytes of the file and the file is currently exactly 2 megabytes in length. While a client issues read operation requests to DV1 for the file, another client decides to extend the length of the file, so it issues a write operation request to DV2. However, DV1 is not notified about that write operation and, as such, its ticket book is not modified or discarded. Therefore, DV1 continues to service read operations to the file as if the length of the file has not increased. The third exemplary rule states that if a client tries to span EOF as perceived by a DV (e.g., DV 1), then the DV obtains a new ticket book from the CAV. Notably, the new ticket book includes the current length of the file.

This situation is also relevant for write operations because the CAV 1810 is the authority for the file's length. When a DV needs to extend a file via a write operation, it sends a message to the CAV requesting a change of length for the file. The CAV then returns a new ticket book with a new file length attribute that is sufficient to accommodate the write operation. In sum, if any operation request directed to a DV 1815 exceeds the EOF associated with its current ticket book, the DV does not reject that request but rather contacts the CAV for a new ticket book. This third rule provides a way for the DV to obtain a new ticket book from the CAV.

If the new ticket book is returned and the file length has not changed, then the DV proceeds through normal semantics. If a read operation is performed that attempts to span EOF, then the DV returns the number of bytes it was able to read and fills the rest of the request (buffer) with zeros. If a write operation is performed that attempts to span EOF, the DV advises the CAV as to the new length of the file. The CAV makes the necessary change to the file length and returns a new ticket book reflecting the change in file length up to the end of the write operation.

The fourth exemplary rule relates to strong serialization semantics. Specifically, the contents of a ticket book can be trusted (used) if (a) weak serialization semantics are used, in which case this rule does not apply, or (b) strong serialization semantics are used and at least one of two tests is satisfied. The first test is whether the DV has a kinetic token. If so, then the DV can use the current ticket book. If not, then the DV considers the time on the local machine (e.g., the filer) when the ticket book was requested and the time that the incoming file operation request arrived. If the ticket book was requested after that file operation arrived, then the DV can use the ticket book; otherwise the DV cannot use the ticket book (i.e., the ticket book is discarded and new one obtained from the CAV).

Figure 8:
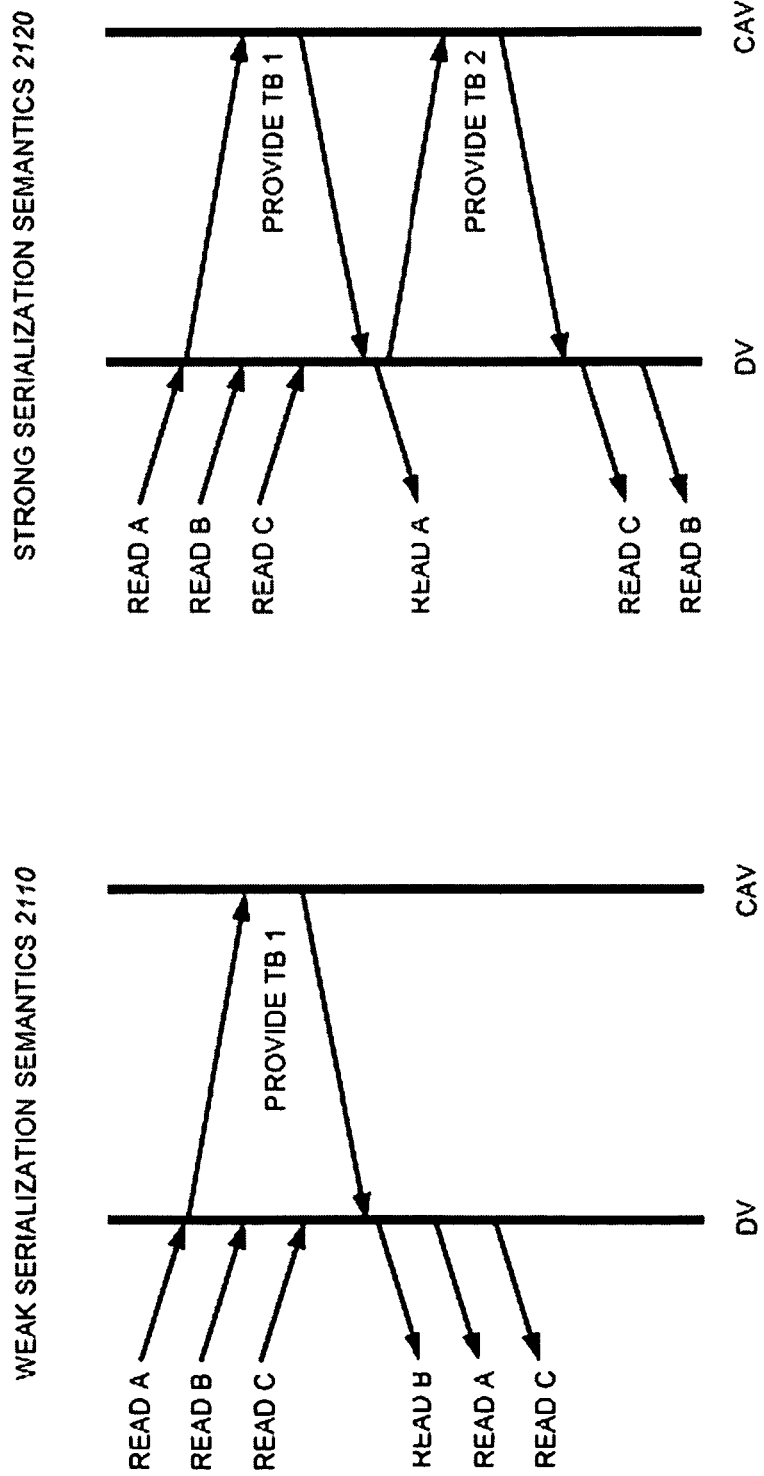
FIG. 8 is a schematic diagram illustrating the affects of weak and strong serialization semantics on storage system performance in accordance with one embodiment.

FIG. 8 is a schematic diagram illustrating the affects of weak and strong serialization semantics on storage system performance in accordance with the exemplary system. Referring to the weak serialization semantics graph 2110, the DV requests a new ticket book (TB 1) when it receives a first I/O operation (e.g., a read operation) and then two more read operations are received while it is waiting for that new ticket book to arrive. As soon as that ticket book is returned, the DV is able to service all stalled read operations (e.g., Reads A-C) using the new ticket book. More specifically, Read A is received by the DV and the DV requests a new ticket book from the CAV. While it is waiting for that new ticket book, DV receives Reads B and C, which are stalled because there is no ticket book to service them. However, the DV does not have to start a new round trip to the CAV for each of those read operations; instead those operations wait on the new ticket book. Once the new ticket book arrives, the DV starts servicing all of the stalled read operations and, notably, they are not necessarily serviced in the order in which they arrived at the DV.

For example, the DV may have started servicing Read A but encountered a portion of the file for an indirect block it does not yet have and, accordingly, Read A is stalled. Meanwhile DV services Read B. If all three Reads A, B, and C are outstanding at the same time from the client's point of view, there is no guarantee as to the order in which the storage system (i.e., D-blade 350) will service the requests. Note that this also applies to outstanding write operations. The only requirement is that once it chooses an order in which to service the (read and/or write) operations, the DV must, for example, return mtimes that are consistent with that order. Since all three operation requests were "in flight" simultaneously, the client provides no guarantees for which one is actually going to reach the D-blade first, much less which one gets serviced first. Client protocols that can handle weak serialization semantics are not concerned about the ordering of the operations in real time versus the ticket book mtimes. As noted, the only requirement is that the order in which the operations are serviced (e.g., Reads B, A, C) is consistent with the mtimes that are returned.

In the case of strong serialization semantics graph 2120, the DV receives a first I/O operation (Read A) and, in response, sends a message to the CAV requesting a new ticket book (TB 1). Meanwhile, two more operations (Reads B and C) are received by the DV. When the new ticket book is returned by the CAV, the DV determines that the ticket book is acceptable for servicing Read A, but cannot be used to service Reads B and C because those latter read operations (B and C) arrived at the D-blade after the DV had requested the new ticket book. Accordingly, the DV sends another message to the CAV requesting another new ticket book (TB 2). If Reads A, B and C had arrived before the new ticket book was requested, then the DV would be able to service all three operations with the ticket book TB 1. The last rule states that the DV can only trust (i.e., use) the ticket book for file operations that arrived before the DV had requested the ticket book.

According to yet another aspect of the exemplary system, a kinetic token 1930 is provided that represents an optimization that enables the storage system to defeat caching behavior at the client and improve the performance of file operations. A kinetic token is a guarantee that every time a client requests the current mtime on the file, the client will receive a higher value than has ever been previously reported. Issuance of a kinetic token by the CAV effectively disables client-side caching because every time the client requests the current mtime, it will receive a higher mtime value. As soon as that guarantee is provided, then the ordering problem for strong serialization semantics is eliminated because the clients no longer caches any data (and, as such, it does not matter what mtime value the storage system returns). The kinetic token provides a guarantee that client-side caching is disabled as clients will always see higher mtimes returned. If the DV receives a request that requires strong semantics, the DV utilizes the technique described above and obtains a new ticket book before servicing the request.

The kinetic token is illustratively granted in recognition that there is a relatively common file access pattern. For example, if many write operations are received by a DV 1815 to a particular file, then the mtimes returned to the clients issuing those operations are constantly being updated (incremented). Recall that every write operation results in updating/incrementing of the mtime on the file. In the case of client-side caching, this pattern of activity forces the client to discard the contents of its cache. The CAV may decide to issue kinetic tokens with the ticket book for heavy write access to the file where the mtimes are changing frequently. That is, frequent activity on the file denotes that the CAV is servicing many requests for ticket books 1900 for the same file, often to one or more DVs. If the CAV heuristically determines that many ticket book requests are received for a particular file, it can choose to issue kinetic tokens for that file. Illustratively, the kinetic token 1930 is implemented as a Boolean flag within the ticket book 1900 that, when asserted, specifies existence of the token.

At some point, the ticket book 1900 with kinetic token 1930 expires or the CAV 1810 may revoke the kinetic token. In order for a DV 1815 to manipulate metadata on the file, the CAV instructs all DVs 1815 that currently have kinetic tokens 1930 to relinquish those tokens. Illustratively, the CAV broadcasts to the DVs a message instructing them to relinquish their kinetic tokens. Once all the DVs have acknowledged that they have given up their tokens, the CAV may halt automatic incrementing of mtimes on query.

I. Efficient Data Consistency Guarantees

The disclosed embodiments are directed to a system and method which improves the efficiency of guaranteeing data consistency to clients, such as for one or more data containers, e.g. files, or other objects, e.g. directories, stored on a plurality of volumes configured as a SVS. In particular, the disclosed embodiments optimize requests from clients which span multiple DV's and which require strong serialization and ensure perception by a client 180 of an expected sequence of operations with respect to a given object at any one of a number of interfaces to the file system. The disclosed embodiments provide a new form of "ticket book," that provides lower latency while improving compatibility with client protocols. While the embodiments below are described in relation to files, it will be appreciated that the disclosed mechanisms may be used with other objects, such as directories, which span multiple DV's.

As was described above, in a clustered system like the ONTAP® GX provided by Network Appliance, Inc., an NFS request—say, a Read call—is sent by a client 180 to an N-blade 310, which, as described, is a network interface to the storage system. That N-blade 310 routes the request to an appropriate D-blade 350, which, as described above, is an interface to the storage devices, for servicing; as part of its response, the D-blade 350 will return not only the answer for the call (success or error, any data being read, etc) but also the "post-operation attributes" for the affected object including, in particular, an "mtime" or modification time: the client 180 associates the response with this timestamp, in effect thinking "At time T, the file contained this data." The NFS client 180 might manage a client-side cache using these attributes: if the cache already has data for time (T-2) for this region of a file, it will update the cache to contain this new data instead since this response is newer.

Ticket books are a mechanism by which multiple clustered filers, i.e. DV's or storage devices, such as devices which do not inherently share the same internal data, can service requests for a single striped object at the same time; each ticket book contains/represents a series of timestamps that the individual filers/DV's can use as post-operation attributes. When a DV's ticket book runs out of timestamps ("tickets"), or when the ticket book can't be used for some other reason, the DV has to stall all inbound requests while it obtains a new ticket book from the CAV. Best performance is therefore realized when a DV can obtain a ticket book once, then use it for a long period of time before being forced to obtain a new ticket book; each request for a new ticket book not only represents stalled I/Os, but also increases intra-cluster traffic.

As described above, a ticket book, in at least one embodiment, preferably meets the following criteria:

1. A client 180 cannot see time roll backwards.
    Any client 180 that performs operation A, waits for it to complete and then performs operation B, preferably, in at least one embodiment, always sees post-operation data modification times ("mtimes") increasing, i.e. the modification time corresponding to operation B must, in at least one embodiment, be greater than or equal (the same or later in time) to the modification time for operation A (corresponding to mtime(A) <=mtime(B)). This would be true even if operations A and B are read-only or affect disjoint data and metadata. The only circumstance when a client 180 may see out-of-order mtimes is when its requests were at some point in flight, i.e. in transit but not yet received, simultaneously (in which case ordering may not be guaranteed).
2. Timestamps, in at least one embodiment, reflect a valid replay order.
    If all operation responses were sorted by their post-operation mtimes and replayed in the resulting order, then the resulting image of the data should accurately reflect the live file system. This rule implies that if two operations have identical mtimes, they must, in at least one embodiment, be disjoint and therefore be safely replayable in any order.
3. Timestamps, in at least one embodiment, correlate with changes to meta-data.
    In addition to mtime, meta-data includes UID/GID, umask, file length or directory link count, associated ACL, etc. If the meta-data changes at time T, then all operations with times before T must, in at least one embodiment, show the old meta-data while all operations with times after T must, in at least one embodiment, show the new meta-data.
4. Timestamps, in at least one embodiment, roughly reflect wall-clock time.
    Post-operation timestamps must, in at least one embodiment, never be higher/later in time than the current object mtime as recorded on the DV, and post-operation timestamps must, in at least one embodiment, be within a few seconds of the actual completion time at the server.

As described in detail above, in one implementation, a "weak serialization" ticket book model may be used for clients 180 that, for example, do not guard a client-side cache by post-operation time stamps. Clients 180 in this category are effectively exempted from the first rule above—that is, sequential operations can involve time rolling backwards, provided that rule two is not thereby violated. For example, such a client 180 might perform a 32 kb write at offset 1 MB and receive post-operation mtime 100, then perform a non-overlapping write at offset 5 MB and receive post-operation mtime 90 without ill effect. (And yet, if those two writes were overlapping—for example, performed at offsets 1 kB and 5 kB instead—then the second operation would still be required to return an mtime of 101 or higher to ensure safe replay ordering.)

Figure 9A:
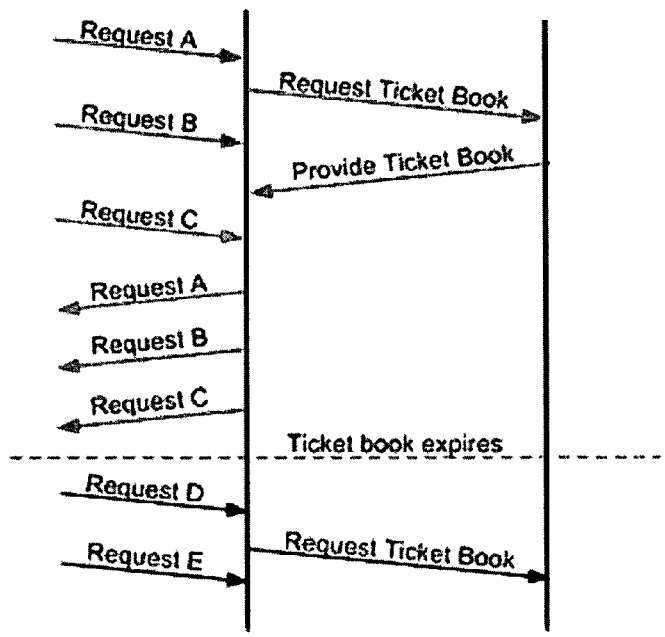
FIGS. 9A and 9B are alternate schematic diagrams illustrating the affects of weak and strong serialization semantics on storage system performance in accordance with one embodiment.

As shown by example in FIG. 9A, when an incoming I/O request is received at a DV, the DV determines whether it can use its current ticket book or must request a new ticket book. In this model, the cached ticket book can be used if it meets all of the following criteria:
 1. The cached ticket book has not expired by the wall clock;
 2. The cached ticket book still has tickets remaining; and
 3. The I/O does not span end-of-file, as currently cached with the inode meta-data.

When safe to employ, weak serialization semantics are preferred because they are highly efficient: once a ticket book is received, it can be used for all incoming I/O requests until it expires or is explicitly revoked. This not only reduces the load on the CAV (by reducing the sheer number of ticket books that are requested), but it also significantly reduces the typical latency observed by a client, since there is one less hurdle to be overcome before an I/O request can be serviced.

Figure 9B:
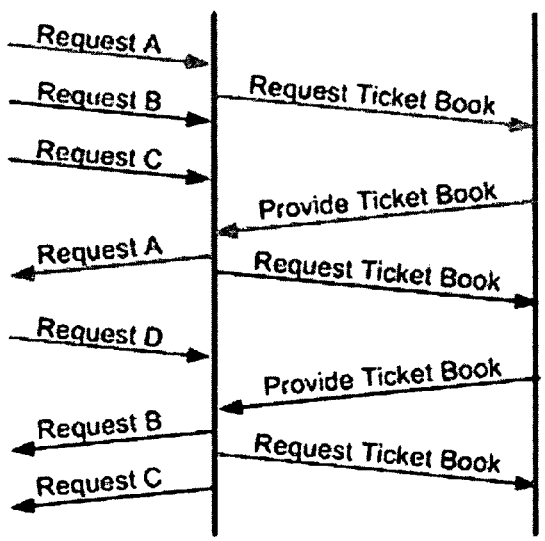

In the case of a client 180 requiring strong serialization, however, a strong serialization ticket book model may be used as was described above. The "strong serialization" model is implemented exactly like the weak model, with the addition of a rule regarding cached ticket book usage: no cached ticket book can be used for operations that arrive after the ticket book was requested. An exemplary event sequence under the "strong serialization" model is shown in FIG. 9B.

This additional rule strengthens serialization semantics significantly but, as a result, dramatically increases latency for clients. The latency increase is a result of forcing every incoming file operation to stall while a new ticket book is obtained. This latency increase is further worsened because, in the current implementation, no DV will have more than one ticket book request outstanding for a file at once. Therefore, when a new I/O request is received, it must wait behind any ongoing current ticket book request and then wait behind a full second request.

Fortunately, maximum throughput is only slightly affected: if there is significant load, many requests will end up waiting for the same ticket book request and so all will be fulfilled when that ticket book is obtained successfully. Because of the additional latency a higher amount of simultaneous load is required to reach maximum throughput, and the additional load on the intra-cluster network and the CAV (as it services far more ticket book requests) impacts peak performance throughout the cluster.

The above described process for handling strong serialization requirements, however, solves at least the problem that any single client that is issuing I/O requests, waiting for them to complete and then issuing more will invariably see increasing mtimes for every operation. This allows the system 100 to return post-operation attributes with full confidence that all clients 180 will behave correctly, which would not otherwise be true if the NFS traffic were treated using weak serialization semantics.

As was described above, kinetic tokens allow the system 100 to take advantage of a particular feature in the NFSv3 protocol: that post-operation attributes are technically optional. The idea is, if the system 100 manages to omit returning post-operation mtimes, then it is impossible for the client 180 to observe mtimes rolling backwards—and so the system 100 is free to use the higher-performing weak serialization model.

However, there are problems with omitting post-operation attributes: the first is that many clients 180, when seeing a lack of such attributes, will immediately (or at least frequently) issue requests to obtain the post-operation attributes, e.g. NFS getattr requests, to the DV to find the current modification time. The getattr calls themselves are not expensive, but it is essential that the system 100 use this opportunity to inform the client that writes have been happening since the last time the client looked, otherwise the NFS client-side cache will become out of date.

To regulate this process, the system 100 detects periods of heavy write load on a file (for example, N requests in one second for write ticket books), and begins issuing kinetic tokens back along with further ticket books. If a DV has a kinetic token, it can service NFSv3 I/Os using weak serialization semantics and omitting post-operation attributes, because it knows that—so long as the kinetic token is outstanding—the CAV will be intercepting NFS getattr requests and returning continually increasing mtimes with each one.

The second problem with omitting post-operation attributes relates to the observed behavior NFS clients 180 when they do not receive post-operations attributes. In particular, many clients 180 may behave very poorly when post-operation attributes are omitted: they may stop sending requests for 5-10 ms, and thereafter send only one request at a time. The result is that kinetic token usage either offers a client 180 the best performance, or the very worst—and this may not be apparent for a given client 180 until they are in operation.

Further, even in the comparably fast weak serialization model, a cached ticket book cannot be used to service an inbound request that spans the current end-of-file (EOF). This means that all file-extending writes must stall while obtaining a new ticket book, a side-effect that may significantly degrade streaming-write performance.

This is compounded by the fact that a file's CAV is the owner for that file's length: during a file extending write, the CAV must extend the file while the DV receiving the write is the only entity that knows the data to be written at EOF. This split opens a window during which the CAV has increased the file's length but the DV has not yet written data to populate that tail. A failure during this window leaves a sparse tail on the file, and even during the success path there are complications involving which I/O to awaken first at the DV (to ensure no other reads or writes observe that sparse tail until it can be populated).

To address these problems, metadata ownership delegation, also referred to as "write extend token," is implemented. When a DV wants to extend a file, instead of asking the CAV to do it, the DV will simply ask the CAV to yield ownership of the file's metadata for a time. The CAV writes a persistent marker on the inode indicating which DV now has ownership of the metadata, and tells the DV to proceed. So long as the DV has ownership of the file's metadata, it can service all the file-extending writes it wants.

Later, when another DV wants to obtain a ticket book or other metadata, the CAV can revoke the metadata ownership. During this process, the DV invalidates its own ticket book and informs the CAV of the final metadata; when the CAV writes the metadata to its disk, it erases the ownership delegation marker. Now the CAV is once again in control of the file's metadata, and can proceed normally.

Because metadata ownership delegation is used only when metadata is in flux (for example, the file's length is changing), the CAV does not yield ownership until all other meta-data caches downstream have been invalidated. This means that a caller who is streaming data to the file will end up in competition with other callers who want random access to the file. Metadata ownership must therefore be governed by appropriate heuristics, to ensure that neither party is starved for access.

One mechanism to address this conflict is that when a DV sends a request to the CAV for a ticket book, the CAV can choose to reflect that request to the current metadata owner rather than always revoking meta-data ownership. There are limitations on the use of ticket books granted in this way (since the metadata for the file is in flux)—for example, such ticket books cannot be used as part of a cross-stripe or EOF-spanning I/O. But for most random I/O (which occurs interior to a stripe and behind EOF), this optimization is important. For further details, see the "Single use ticket book" description below.

The disclosed embodiments address the problem that kinetic tokens may be unreliable in the field (because of pathological NFS client behavior), and that ticket books must be expanded to service striped directories as well as striped files as the slow performance offered by the strong serialization model described above would increase directory manipulation latency to an unacceptable level. The disclosed embodiments implement a new ticket book model and a supporting metadata ownership delegation mechanism as described above.

Figure 10:
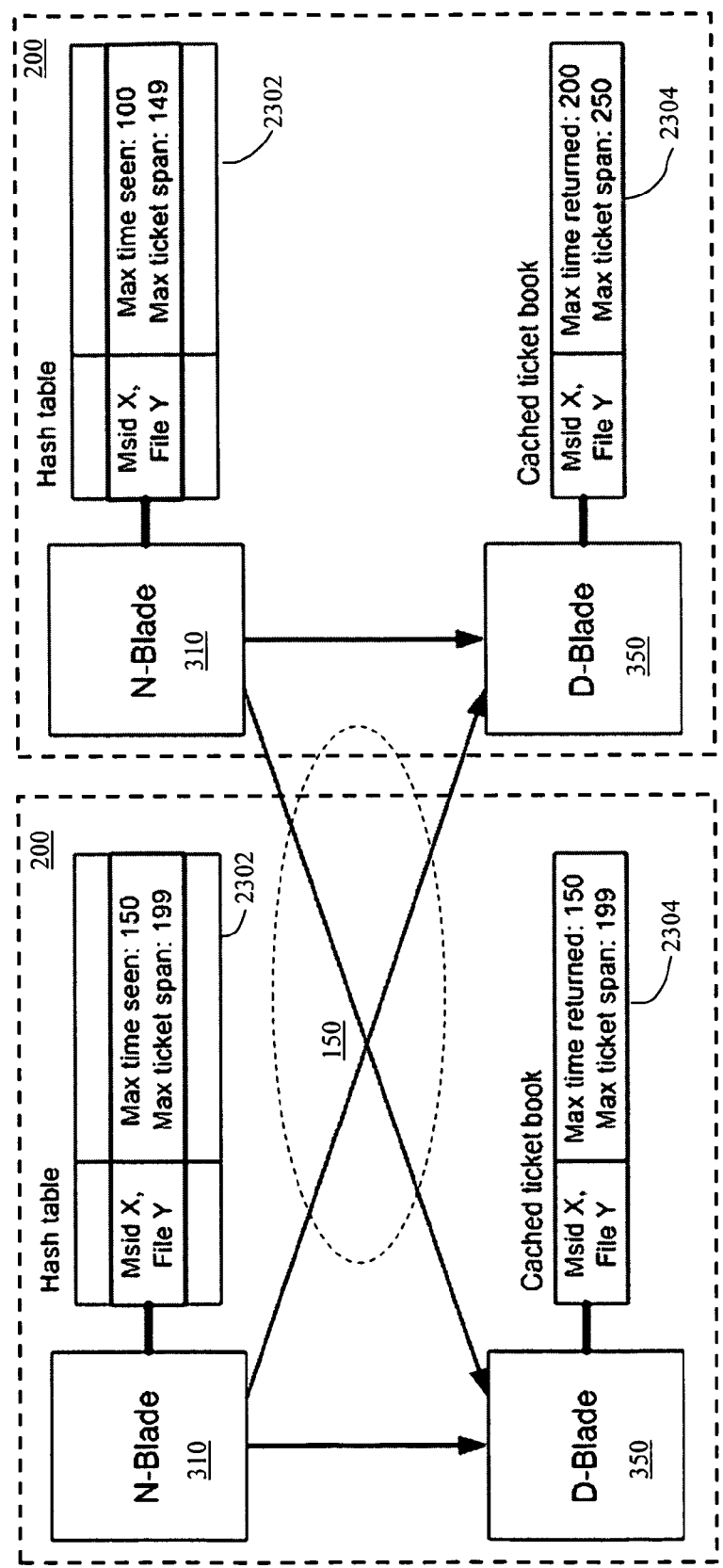
FIG. 10 is schematic block diagram of a plurality of nodes interconnected as a cluster showing the caching of ticket books in accordance with one embodiment.

FIG. 10 depicts a schematic block diagram of a portion of the cluster 100 of FIG. 1 configured to provide storage service relating to the organization of information on storage devices. The nodes 200 of the cluster 100 are described above with respect to FIG. 1 and comprise various functional components that cooperate to provide a distributed storage system architecture of the cluster 100, i.e. each node 200 is generally organized as a network element (N-blade 310) and a disk element (D-blade 350). As was described, the N-blade 310 includes functionality that enables the node 200 to connect to clients 180 over a computer network 140, such as a TCP/IP based network, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch.

Each N-blade 310 further includes a data structure 2302 for caching mtimes as will be described. The data structure 2302 may be implemented as a hash table and may be stored in the memory 224, described above with respect to FIG. 2. Each D-blade 350 further includes a ticket-book cache 2304 which may also be stored in the memory 224.

J. Viral Ticket Book

The "viral" ticket book model of the disclosed embodiments addresses the primary four rules, discussed above, in the following fashion:

Rule 1 Time cannot roll backwards

Unlike the ticket book models described above, this viral model involves the N-blade 310 in the timestamp process. Under normal operating conditions, it has been observed that clients 180 typically develop an affinity for a particular N-blade 310 and, therefore, tend to direct their requests consistently to the same one. Therefore, the N-blade 310 can act to some extent as a proxy for a particular client 180, i.e. attempt to predict the client's expectations, so as to ensure the client 180 receives the responses that it expects.

To take advantage of this affinity, the N-blade 310 may implement a hash table 2302, or other data structure or construct, for mapping a file handle (MSID, fileid, generation), or other object association, to timestamp data (highest timestamp ever returned to a client, and corresponding ticket book expiration data), effectively caching the current ticket book for the object that is also cached by the associated D-Blade. This cached timestamp ideally reflects the last timestamp client 180 saw and which the client 180 likely now expects to be exceeded by the timestamp of the next response associated with that same object or portion thereof. When reflecting a file operation to a D-blade 350, the N-blade 310 will first look up any existing hash table entry and sends the data it finds there (if any) down to the D-blade 350 along with the rest of the request. In its response, the D-blade 350 will return post-operation attributes along with new settings for the N-blade 310 to cache, i.e. a new timestamp greater than the one sent by the N-blade.

By advising the D-blade 350 about what timestamps this N-blade 310 has returned previously, the D-blade 350 can guarantee that it will return a higher mtime as a post-operation attribute than any earlier value. This ensures that any client 180 that has performed a request earlier, waited for a response and then issued this request, will always see increasing timestamps. (Note that if the N-blade 310 has outstanding requests to multiple D-blades 350 simultaneously, this process does not guarantee that every timestamp returning from the N-blade 310 to its clients 180 will always increase; such level of protection is unnecessary, since any such requests were all in-flight simultaneously, and could reasonably have been fulfilled in any order.) The N-blade's 310 participation therefore solves ticket book rule 1 (no time roll-backs).

If the N-blade 310 does not have a cached ticket book for the file, or it is not valid (see Rule 4 below), it may not send any timestamp along with the request, signaling the D-blade 350 that it must request a new ticket book from the CAV. If the D-blade 350 fails to have a valid cached ticket book associated with the file, the D-blade 350 will request a new ticket book from the CAV.

Rule 2 Timestamps must reflect replay order

This rule states that, if operations are replayed in their timestamp-order, the result must reflect the actual file system. If two operations do not affect the same data, then those operations can be replayed in any order without affecting the final result. This rule is further implemented by recognizing that any two operations that affect overlapping data, must eventually be serviced by the same DV.

Therefore, to address this rule, the D-blade 350 implements a rule that any response it makes to any N-blade 310 will involve a higher timestamp than any that it has returned for this file previously. If the D-blade 350 has no such timestamp available, it will simply obtain a new ticket book from the CAV; the new ticket book is guaranteed to have a new, higher set of timestamps for use. Essentially, all D-blades 350 negotiate the highest timestamp that of the D-blades 350 has ever returned before, and all D-blades 350 advance their timestamps forward to at least that value. By ordering all potentially conflicting operations at the D-blade 350, rule 2 is solved.

Rule 3 Timestamps must reflect changes in metadata

This rule is addressed by metadata invalidation, i.e. when changes are made to metadata at the CAV, the DVs are forced to discard their cached meta-data, i.e. any previously allocated ticket books. A DV may not service I/O requests without a valid ticket book, and therefore must request a new ticket book, having a new allocation of data modification timestamps, from the CAV before proceeding. Requesting a new ticket book ensures that the DV will always return timestamps to clients that are later in time—thereby ensuring that the new metadata is always returned to the client with a timestamp that is later than the metadata change time.

Essentially, the file's metadata is associated with the ticket book itself and is cached, invalidated, etc. therewith. If the metadata is modified, a new ticket book having higher non-overlapping timestamps is generated and propagated, thereby virally invalidating any prior cached ticket books and cached metadata that necessarily have lower timestamps.

Note that this ticket book model requires that, when a file's length (or a directory's nlink count) changes, all metadata caches must be invalidated. This would normally be a fatal flaw in streaming-write or heavy directory-modification work-loads. To overcome this, metadata ownership delegation, as described, is employed whenever a file's length or directory's nlink count affected by an operation.

Rule 4 Timestamps must roughly reflect real time

There are two aspects to this rule: timestamps must not be too far behind wall-clock time, and timestamps must not be higher than the time recorded at the CAV. These rules may be satisfied by expiring the ticket book by wall-clock time, and by ensuring that every timestamp returned as a post-operation attribute comes from a ticket book. Ticket book expiration may be implemented, in one embodiment, by associating the ticket book with an indication of the time when it was allocated by the CAV and configuring the DV to compare the allocation time with current time, e.g. wall-clock time. If the DV determines that a threshold amount of time, such as 50, 100 or 200 milliseconds, has elapsed since the ticket book was allocated, it may consider the ticket book invalid. (The timestamps issued by the CAV as part of ticket book, may be actually behind the time recorded on disk.)

In one embodiment, a storage architecture is provided which is capable of ensuring perception of a sequence of operations meets a client's expectations with respect to the order of operations performed with respect to an object at any one of a plurality of interfaces to a file system. The storage architecture, as described above includes a plurality network interfaces, e.g. N-Blades 310, capable of being in communication with a network and a plurality of storage interfaces, e.g. D-Blades 350. Each network interface is capable of receiving a request from a client via the network, the request being associated with an object, such as a file, directory, or combination thereof, wherein a particular network interface which receives the request is further operative to provide the request to at least one of the plurality of storage interfaces.

Each of the plurality of storage interfaces is capable of being in communication with at least one of the plurality of network interfaces and at least one of a plurality of storage devices which stores at least a portion of the object, each storage interface being operative to process the request and, based thereon, return a response to the particular network interface to send to the client. Each of the plurality of network interfaces further includes a memory, such as a hash table or other memory, for storing a first timestamp associated with the object.

The particular network interface which receives the request is further operative to provide the first timestamp, if stored in the memory, along with the request to the at least one of the plurality of storage interfaces. The at least one of the plurality of storage interfaces is operative to determine a second timestamp not less than the first timestamp, if provided, and return the second timestamp along with the response to the particular network interface. The second timestamp may be determined based on an allocation of timestamps, such as a ticket book, associated with the object.

The allocation of timestamps may be obtained if not already obtained or if invalid. In one embodiment, one of the plurality of storage devices may be the owner of the object and operative to provide the allocation of timestamps associated therewith, each allocation comprising at least one larger non-overlapping timestamp then previously allocated. Each of the plurality of storage interfaces may be further operative to discard the allocation of timestamps and obtain a new allocation of timestamps when metadata associated with the object is modified. The at least one of the plurality of storage interfaces may be further operative to determine the second timestamp to be greater than any other timestamp previously returned for the object by another of the plurality of storage interfaces.

The particular network interface is operative to store the second timestamp in the memory in association with the object, in place of the first timestamp if stored, and provide the second timestamp to the client along with the response. In one embodiment wherein the file is associated with metadata and where the request may result in modification of the metadata, such as a request to extend the file, the at least one of the plurality of storage interfaces may obtain exclusive control of modifying the metadata. In another embodiment, the at least one of the plurality of storage interfaces may be further operative to provide another of the plurality of storage interfaces with a timestamp to be returned by that other of plurality of storage interfaces to a network interface which sent a request associated with the object to the other of the plurality of storage interfaces.

Figure 11:
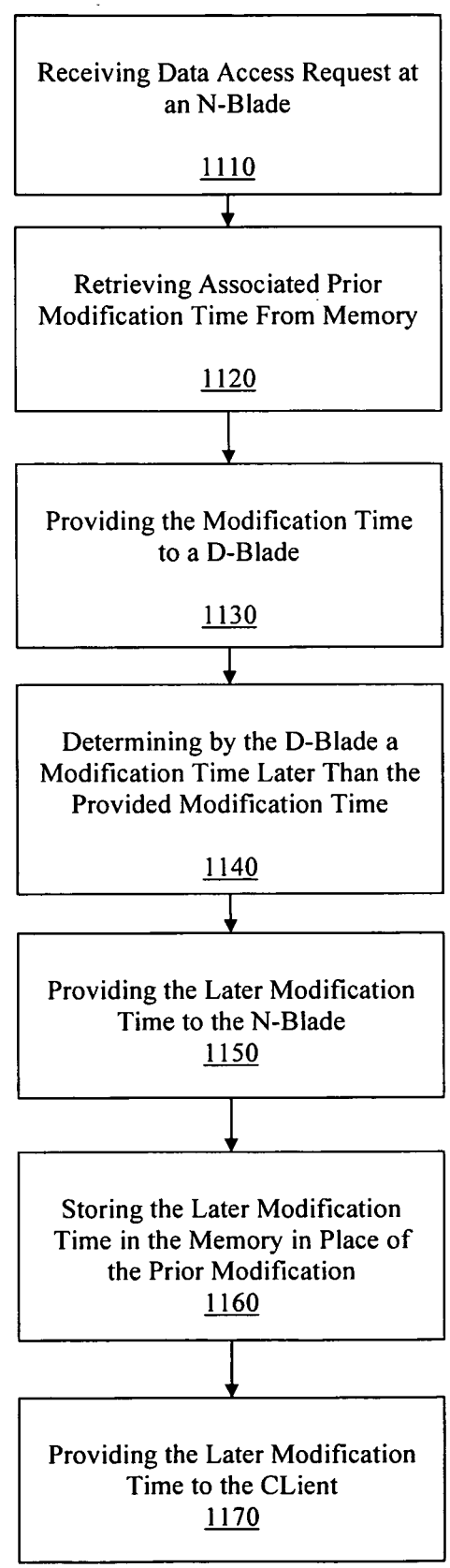
FIG. 11 depicts a flow chart showing exemplary operation of the virtual ticket book according to one embodiment.

FIG. 11 depicts a flow chart showing exemplary operation of the virtual ticket book, according to one embodiment, which permits indication to a requesting client of the order in which data access requests are completed by the file system with respect to at least a portion of an object stored therein. As was described, data access requests for objects, or portions thereof, from clients are received by one of the network interfaces, e.g. N-Blade 310 (Block 1110) The network interface, using a hash table or other data construct, retrieves from a memory, such as a cache memory, the most recent indication of when the object, or portion thereof, was last modified, e.g. the network interface determines the most recently assigned mtime for the object, or portion thereof (Block 1120). This indication, along with the data access request, is then provided to one of the storage interfaces, e.g. D-Blade 350, associated with the object, or portion thereof (Block 1130). The storage interface processes the data access request and determines a new indication of when the file was last modified, e.g. a new mtime, based on pre-defined set of indications, e.g. based on a ticket book, and, in particular, determines this new indication to be later than the previously provided indication (Block 1140). The new later indication is then provided back to the network interface (Block 1150) which stores the new indication in place of the prior indication in the memory (Block 1160) and provides the later indication to the client in response to the data access request (Block 1170).

Note that there is no requirement that a given DV must return timestamps that never overlap with those returned by that DV. That is, the appearance of delegating one timeslice to one DV and another timeslice to another DV is not a requisite part of the process for addressing the four rules governing correct ticket book usage.

To the contrary, it is actually beneficial if the various D-blades 350 can end up sharing ticket books: so long as each D-blade 350 returns higher timestamps than any it has returned before, and so long as each N-blade 310 advises the D-blade 350 to return higher timestamps to it than any it has seen before. There are no causal violations from this sharing. Rather, this sharing can enable D-blades 350 to service requests far more often without obtaining new ticket books:

1. If the ticket book presently stored by the D-blade 350 is expired or behind the N-blade's 310 data, the D-blade 350 copies and then uses the ticket book presently stored by the N-blade 310. This rule does not apply if either the N-blade 310 or the D-blade 350 has never heard of the file before (not having an invalidated or expired ticket book to examine): in these cases, the D-blade 350 cannot be sure of what timestamps it has returned or the N-blade 310 has seen, and so it must obtain a new ticket book to service the request anyway.
2. During cross-stripe I/O, e.g. operations which affect an object which spans more than one stripe in the file system, and therefore are handled by more than one D-blade 350, the D-blades 350 involved, e.g. DV1 and DV2, negotiate the final timestamps to provide back to the client. In particular, DV1 advises DV2 of its current ticketbook and proposes a timestamp to return to the client. DV2 may choose to update its ticket book based on the ticket book of DV1 if the time stamp proposed by DV1 is higher/later in time than the timestamps contained in DV2's ticket book. Alternatively, if DV2 has the higher timestamp values in its ticket book, DV1 may copy it. In either case, both DVs remember the post-operation timestamp of this operation as the highest (latest in time) value they have ever returned, so as to ensure that later/higher value is returned for a subsequent operation.

As compared with prior ticket book implementations which improved efficiency in the case of weak serialization, the disclosed embodiments permit cached ticket book usage more often while safely returning post-operation attributes for every operation. This provides improved performance, while avoiding the client-side difficulties exposed by kinetic token usage describe above.

In an alternate embodiment where metadata ownership delegation, as described above, is provided, "single use" ticket books may also be provided as an optimization. Single use ticket books reduce latency in operations that would otherwise have to stall behind revoking metadata ownership delegation, i.e. operations that would otherwise have to wait for the CAV to revoke delegated ownership of metadata from the DV. The single use ticket book is identical to the ticket books used to implement strong serialization. An operation can only use a single use ticket book if it arrived at the DV before the ticket book was requested from the CAV. When a DV requests a ticket book, it sets a flag indicating whether a single use ticket book can be used to process the operation that prompted the request. When a ticket book request arrives at the CAV for an Mode whose meta-data ownership has been delegated, the CAV sends a revoke to the DV that holds the delegation and passes the flag indicating whether a single use ticket book is acceptable. When a DV receives a revoke for meta-data ownership it normally stalls the revoke until it is done with the work that affects the delegated meta-data. If the revoke request indicates that a single use ticket book is acceptable, the DV can refuse the revoke request and supply a single use ticket book in its response to the CAV. This allows some operations to proceed without waiting for the metadata delegation to be revoked.

One of the side-effects of this ticket book model is that a client may observe identical mtimes for disjoint operations that are in flight simultaneously; this occurs because a particular ticket book might be shared by two DVs, and both DVs might pull the same ticket off as a post-operation mtime.

However, such a condition may be permissible, for two reasons:

1. NFSv2 and NFSv3 clients may expect identical timestamps and therefore properly handle the occurrence thereof.
2. NFS clients may allow two unrelated operations, e.g. operations which do not affect the same data, to complete with the same timestamp, as they do not modify the same content and therefore would not affect the client's caching of that data.

Alternatively, if this does become a problem: within each range of tickets 0 . . . N, constituent volume #V can be instructed to return only tickets where (mtime % dvcount==V). The result is that two DVs can use the same ticket book, and yet never return precisely the same time stamp. This change does not affect any of the other properties described above: the N-blade s310 till always sees increasing times regardless of D-blade 350, and the D-blade 350 still always returns increasing times regardless of N-blade 310.

The disclosed embodiments permit the use of cached ticket books far more often than non-cached models described above, and yet ensure that all responses to clients include valid post-operation attributes. This combines a dramatic performance improvement with better client compatibility.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. In addition, while the disclosed embodiments have been described in relation to files, it will be appreciated that they may be applicable to other objects such as directories. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Also the data structures described herein may include additional fields for storing additional information. Therefore, it is the object of the appended claims to cover all such variations and modifications as come within the true spirit and scope of the invention.

We claim:

1. A storage architecture for enabling a sequence of operations with respect to an object, comprising:
    a storage element in communication with a first storage, the first storage comprising at least a portion of an object; and
    a network element in communication with the storage element, the network element comprising a cache of a first ticket book associated with the object, wherein a ticket book is a data structure comprising a plurality of different modification time attributes,
        wherein the network element is configured to:
            receive a request to perform an operation upon the at least a portion of the object; and
            forward at least a portion of the request in conjunction with an indication of what timestamps of the first ticket book have been returned previously to a client, to the storage element,
        wherein the storage element is configured to request a second ticket book based on the first ticket book, and
        wherein the plurality of different modification time attributes of the first ticket book and the plurality of different modification time attributes of the second ticket book comprise non-overlapping ranges of time stamps allocated before receipt of the request to perform the operation.

2. The storage architecture of claim 1 wherein the object comprises at least one of a file, a directory, or a combination thereof.

3. The storage architecture of claim 1 wherein the network element comprises an N-Blade and the storage element comprises a D-blade.

4. The storage architecture of claim 1 wherein the first ticket book and the second ticket book are generated by a Container Attribute Volume (CAV).

5. The storage architecture of claim 1 wherein the first ticket book and the second ticket book correspond to a modification time attribute assigned to the object.

6. The storage architecture of claim 1 wherein the first ticket book reflects an order in which operations were performed on the object.

7. The storage architecture of claim 1, wherein the storage element is configured to determine a highest timestamp previously returned by another storage element.

8. The storage architecture of claim 1, wherein the network element is further configured to forward an indication to the storage element that the first ticket book has expired, and wherein the plurality of different modification time attributes of the second ticket book correspond to values which substantially reflect real time.

9. The storage architecture of claim 1, wherein to request a second ticket book based on the first ticket book comprises to determine that fewer than a threshold of timestamps remain in the first ticket book and requesting the second ticket book based upon the determination.

10. A method of enabling a sequence of operations with respect to an object in a file system, the method comprising:
    receiving, at a network element, a request to perform an operation upon at least a portion of an object stored on at least one storage device in communication with a storage element;
    forwarding from the network element to the storage element, at least a portion of the request in conjunction with an indication of what timestamps of a first ticket book stored at the network element have been returned previously to a client, wherein a ticket book is a data structure comprising a plurality of different modification time attributes; and
    requesting, at the storage element, a second ticket book based on the first ticket book,
    wherein the plurality of different modification time attributes of the first ticket book and the plurality of different modification time attributes of the second ticket book comprise non-overlapping ranges of time stamps allocated before receipt of the request to perform the operation.

11. The method of claim 10, wherein the object comprises at least one of a file, a directory, or a combination thereof.

12. The method of claim 10 wherein the network element comprises an N-Blade and the storage element comprises a D-blade.

13. The method of claim 10, wherein the first ticket book and the second ticket book are generated by a Container Attribute Volume (CAV).

14. The method of claim 10, wherein the first ticket book reflects an order in which operations were performed on the object.

15. The method of claim 10, wherein the storage element is configured to determine a highest timestamp previously returned by another storage element.

16. The method of claim 10, wherein, the network element is further configured to forward an indication to the storage element that the first ticket book has expired, and wherein the plurality of different modification time attributes of the second ticket book correspond to values which substantially reflect real time.

17. The method of claim 10, wherein to request a second ticket book based on the first ticket book comprises to determine that fewer than a threshold of timestamps remain in the first ticket book and requesting the second ticket book based upon the determination.

18. At least one non-transitory computer-readable medium comprising instructions configured to cause a storage system to:
    receive, at a network element, a request to perform an operation upon at least a portion of an object stored on at least one storage device in communication with a storage element;
    forward from the network element to the storage element, at least a portion of the request in conjunction with an indication of what timestamps of a first ticket book stored at the network element have been returned previously to a client, wherein a ticket book is a data structure comprising a plurality of different modification time attributes; and
    request at the storage element, a second ticket book based on the first ticket book,
    wherein the first plurality of different modification time attributes of the ticket book and the plurality of different modification time attributes of the second ticket book comprise non-overlapping ranges of time stamps allocated before receipt of the request to perform the operation.

19. The at least one non-transitory computer readable medium of claim 18, wherein the object comprises at least one of a file, a directory, or a combination thereof.

20. The at least one non-transitory computer readable medium of claim 18, wherein the network element comprises an N-Blade and the storage element comprises a D-blade.

21. The at least one non-transitory computer readable medium of claim 18, wherein the first ticket book and the second ticket book are generated by a Container Attribute Volume (CAV).

22. The at least one non-transitory computer readable medium of claim 18, wherein the first ticket book reflects an order in which operations were performed on the object.

23. The at least one non-transitory computer readable medium of claim 18, wherein the storage element is configured to determine a highest timestamp previously returned by another storage element.

24. The at least one non-transitory computer-readable medium of claim 18, wherein to request a second ticket book based on the first ticket book comprises to determine that fewer than a threshold of timestamps remain in the first ticket book and requesting the second ticket book based upon the determination.

* * * * *